(12) United States Patent
Kato

(10) Patent No.: US 6,272,089 B1
(45) Date of Patent: Aug. 7, 2001

(54) PRE-PIT DETECTING APPARATUS

(75) Inventor: Masahiro Kato, Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/276,067

(22) Filed: Mar. 25, 1999

(30) Foreign Application Priority Data

Mar. 26, 1998 (JP) .................................................. 10-100398

(51) Int. Cl.$^7$ ....................................................... G11B 7/00
(52) U.S. Cl. ..................................... 369/53.41; 369/44.13; 369/47.1
(58) Field of Search ................................ 369/47.1, 47.11, 369/47.28, 53.1, 53.2, 53.22, 53.41, 59.1, 32, 44.13, 44.26, 44.27, 44.32, 275.4

(56) References Cited

U.S. PATENT DOCUMENTS 5,073,880 * 12/1991 Maeda et al. .................. 369/44.13 X
5,195,076 *  3/1993 Aoki ........................................ 369/58

* cited by examiner

Primary Examiner—Muhammad Edun
(74) Attorney, Agent, or Firm—Pitney, Hardin, Kipp & Szuch LLP

(57) ABSTRACT

On an optical disc, an information record track wobbled in accordance with a wobbling signal is formed and pre-pits are formed at an predetermined interval on a guide track adjacent to the information record track. A pre-pit signal based on the pre-pit is detected by a pre-pit detecting apparatus. The pre-pit detecting apparatus is provided with: a composite signal extracting device for extracting a composite signal, in which the pre-pit signal is superimposed on the wobbling signal, out of a reflection light from the optical disc; a relaying device for relaying the composite signal extracted by the composite signal extracting device; a pre-pit signal detecting device for detecting a component of the pre-pit signal from the composite signal relayed by the relaying device; a wobbling signal extracting device for extracting a component of the wobbling signal out of the composite signal relayed by the relaying device; a synchronization wobbling signal generating device for generating a synchronization wobbling signal, whose frequency and phase are respectively synchronous with a frequency and a phase of the wobbling signal extracted by the wobbling signal extracting device; and a defect detecting device for detecting a defect on the optical disc. The relaying device relays the synchronization wobbling signal instead of the composite signal, if the defect is detected by the defect detecting device.

8 Claims, 10 Drawing Sheets

PRE-PIT DETECTING APPARATUS

BACKGROUND OF THE INVENTION

1. Field of the Invention

The present invention relates to a pre-pit detecting apparatus for detecting a pre-pit signal, which carries pre-pit information such as address information and which is recorded in advance on an optical disc on which record information of video data, audio data and the like can be recorded later by a user.

2. Description of the Related Art

There is a CD-R (Compact Disc Recordable) as a WO (Write-Once) type of high density recording medium, onto which the record information data can be written just once. The CD-R is an optical record medium having a record capacity similar to that of a CD dedicated to a reproduction. Pre-information, such as address information required to search a position on the optical disc at which the record information is to be recorded, rotation control information used for a rotation control of the CD-R, such as a synchronization signal, are recorded by wobbling an information record track (i.e., a groove track or a land track) on which the record information is to be recorded, in a wave form based on a signal which is FM (Frequency Modulation)-modulated in accordance with the pre-information to be recorded, at the stage of pre-formatting when the CD-R is manufactured.

When the information is actually recorded onto the CD-R, a signal including a wobbling frequency component of the wobbled track (hereafter, referred to as a wobbling signal) is detected, and a standard clock for controlling the rotation of the CD-R is extracted therefrom. Then, a drive signal for controlling a rotation of a spindle motor of rotating the CD-R is generated on the basis of the extracted standard clock. Also, a clock signal for the recording operation is generated which includes the information of a timing synchronous with the rotation of the CD-R.

Moreover, the address information on the CD-R required to record the record information is obtained from the wobbling signal. A position at which the record information is to be recorded is detected in accordance with the obtained address information to thereby record the record information.

There is a DVD-R (DVD-Recordable) in which the record density is improved over the CD-R. In this DVD-R, an interval between the information record tracks adjacent to each other is substantially half of that of the CD-R, from a request of improving the record density. Thus, even if the pre-information is obtained from the conventionally-wobbled information record track on the DVD-R, the wobbling signals on the information record tracks adjacent to each other interfere with each other. Hence, there may be a case that the wobbling signal cannot be exactly detected.

Then, in a case of the DVD-R, the pre-information is recorded by wobbling the information record track (for example, the groove track) on the DVD-R at a frequency in accordance with the standard clock and additionally forming pre-pits corresponding to the pre-information on a guide track (for example, the land track), which is positioned between the information record tracks adjacent to each other and which guides a light beam to the information record track. Moreover, the pre-pits are substantially uniformly formed on an entire surface of the DVD-R so that the standard clock can be generated from the pre-pits as the occasion demands.

The pre-information is obtained by detecting such a pre-pit, and the exact rotation control and the record control are carried out in accordance with this pre-information.

By the way, the applicant knows one method of detecting the pre-pit, which is carried out as follows.

That is, as shown in FIG. 10, a gate signal, which is phase-synchronous with the wobbling signal obtained by emitting a light beam onto the information record track, is generated. Then, only the signal exceeding a predetermined threshold signal is extracted by comparing the wobbling signal with the predetermined threshold signal.

Then, the pre-pit signal superimposed on the wobbling signal is extracted by calculating a logical product of this extracted signal and the gate signal.

However, if a defect resulting from a crack, a dust and the like is present on the DVD-R, there may be a case that this defect causes a noise in a form of a pulse, which is superimposed on the wobbling signal. In such a case, the pre-pit detecting apparatus using the above-mentioned method of detecting the pre-pit may erroneously detect the noise in the form of the pulse as the pre-pit signal.

SUMMARY OF THE INVENTION

The present invention is proposed in view of the above mentioned problems. It is therefore an object of the present invention to provide a pre-pit detecting apparatus, which can reduce the an erroneous detection of a pre-pit signal even if a noise component in a form of a pulse is superimposed on a wobbling signal because of a defect on a disc.

The above object of the present invention can be achieved by a first pre-pit detecting apparatus for detecting a pre-pit signal based on a pre-pit from an optical disc, on which an information record track wobbled in accordance with a wobbling signal is formed and on which pre-pits are formed at an predetermined interval on a guide track adjacent to the information record track. The first pre-pit detecting apparatus is provided with: a composite signal extracting device for extracting a composite signal, in which the pre-pit signal is superimposed on the wobbling signal, out of a reflection light from the optical disc; a relaying device for relaying the composite signal extracted by the composite signal extracting device; a pre-pit signal detecting device for detecting a component of the pre-pit signal from the composite signal relayed by the relaying device; a wobbling signal extracting device for extracting a component of the wobbling signal out of the composite signal relayed by the relaying device; a synchronization wobbling signal generating device for generating a synchronization wobbling signal, whose frequency and phase are respectively synchronous with a frequency and a phase of the wobbling signal extracted by the wobbling signal extracting device; and a defect detecting device for detecting a defect on the optical disc, the relaying device relaying the synchronization wobbling signal instead of the composite signal, if the defect is detected by the defect detecting device.

According to the first pre-pit detecting apparatus, when a light beam is emitted onto the optical disc and the reflection light of the light beam is received from the optical disc, the composite signal, in which the pre-pit signal is superimposed on the wobbling signal, is extracted out of the reflection light by the composite signal extracting device. Then, the extracted composite signal extracted is relayed by the relaying device. Then, the component of the pre-pit signal is detected by the pre-pit signal detecting device, from the relayed composite signal. On the other hand, the component of the wobbling signal is extracted by the wobbling signal extracting device out of the relayed composite signal. The synchronization wobbling signal, whose frequency and phase are respectively synchronous with the frequency and the phase of the extracted wobbling signal, is generated by the synchronization wobbling signal generating device. The defect on the optical disc, onto which a light beam is emitted, is detected by the defect detecting device. At this time, if the defect is detected by the defect detecting device, the synchronization wobbling signal is relayed by the relaying device instead of the composite signal.

Therefore, since the synchronization wobbling signal which is free from the influence of the defect is supplied instead of the composite signal to the pre-pit signal detecting device if the defect is detected, it is possible to prevent the pre-pit signal detecting device from erroneously detecting the noise due to the defect as the pre-pit signal.

The above object of the present invention can be also achieved by a second pre-pit detecting apparatus for detecting a pre-pit signal based on a pre-pit from an optical disc, on which an information record track wobbled in accordance with a wobbling signal is formed and on which pre-pits are formed at an predetermined interval on a guide track adjacent to the information record track. The second pre-pit detecting apparatus is provided with: a composite signal extracting device for extracting a composite signal, in which the pre-pit signal is superimposed on the wobbling signal, out of a reflection light from the optical disc; a pre-pit signal detecting device for detecting the pre-pit signal from the composite signal extracted by the composite signal extracting device; a defect detecting device for detecting a defect on the optical disc; a removing device for removing the pre-pit signal detected by the pre-pit detecting device when the defect is detected by the defect detecting device and outputting the pre-pit signal when the defect is not detected by the defect detecting device; and a pre-pit signal selecting device for comparing probabilities of the pre-pit signal outputted from the removing device and the pre-pit signal outputted. from the pre-pit signal detecting device and selecting one of the pre-pit signals whose probability is higher than the other on the basis of a comparison result.

According to the second pre-pit detecting apparatus, when a light beam is emitted onto the optical disc and the reflection light of the light beam is received from the optical disc, the composite signal, in which the pre-pit signal is superimposed on the wobbling signal, is extracted out of the reflection light by the composite signal extracting device. Then, the pre-pit signal is detected by the pre-pit signal detecting device from the extracted composite signal. On the other hand, the defect on the optical disc is detected by the defect detecting device. When the defect is detected by the defect detecting device, the detected pre-pit signal is removed by the removing device. Alternatively, when the defect is not detected by the defect detecting device, the pre-pit signal is outputted by the defect detecting device. Then, the probabilities of the pre-pit signal from the removing device and the pre-pit signal from the pre-pit signal detecting device are compared with each other by the pre-pit signal selecting device. Finally, on the basis of this comparison result, one of the pre-pit signals is selected whose probability is higher than the other.

Therefore, if the noise resulting from the defect is erroneously detected as the pre-pit signal, the pre-pit signal outputted through the removing unit is selectively outputted. On the other hand, if the pre-pit signal is removed since it is superimposed on the position where the defect occurs although it is in fact the pre-pit, the pre-pit signal outputted by the pre-pit signal detecting unit is selectively outputted as it is. Hence, this manner is desirable since the erroneous detection or non-detection resulting from the defect can be reduced.

In one aspect of the first or second pre-pit detecting apparatus of the present invention, the defect detecting device detects the defect on the basis of a detection signal which is detected out of the reflection light from the optical disc.

According to this aspect, the detection signal is detected out of the reflection light from the optical disc. Then, the defect is detected by the defect detecting device on the basis of this detection signal.

In this aspect, the defect detecting device may be provided with: a first peak holding circuit for holding a peak of the detection signal; a second peak holding circuit having a time constant longer than that of the first peak holding circuit for holding the peak of the detection signal; a level adjusting unit for adjusting an amplitude level of an output signal from the second peak holding circuit; and a comparator for comparing a level of an output signal from the first peak holding circuit with a level of an output signal from the level adjusting unit, to output a defect pulse signal, which has a high or low level corresponding to a period for which the defect occurs on the basis of a comparison result of the comparator.

In this case, the peak of the detection signal is held by the first peak holding circuit. On the other hand, the peak of the detection signal is held by the second peak holding circuit. Then, the amplitude level of the output signal from the second peak holding circuit is adjusted by the level adjusting unit. Then, by the comparator, the level of the output signal from the first peak holding circuit is compared with the level of the output signal from the level adjusting unit. Finally, since the second peak holder circuit has a time constant longer than that of the first peak holding circuit, the defect pulse signal, which has a high or low level corresponding to a period for which the defect occurs is outputted on the basis of the comparison result of the comparator.

In another aspect of the first pre-pit detecting apparatus, the relaying device is provided with a switching device for switching to output the composite signal if the defect is not detected by the defect detecting device and switching to output the synchronization wobbling signal if the defect is detected by the defect detecting device.

According to this aspect, the switching device for switching to output the composite signal if the defect is not detected by the defect detecting device and switching to output the synchronization wobbling signal if the defect is detected by the defect detecting device. Thus, if the defect is not detected, the composite signal is outputted to the pre-pit signal detecting device as it is by the switching device. Alternatively, if the defect is detected, the synchronization wobbling signal is outputted to the pre-pit signal detecting device by the switching device. Therefore, it is possible to prevent the pre-pit signal detecting device from erroneously detecting the noise due to the defect as the pre-pit signal.

In another aspect of the second pre-pit detecting apparatus, the pre-pit signal selecting device is provided with: a first decoder for decoding the pre-pit detection signal outputted from the pre-pit signal detecting device; a first counter for counting the number of detection errors in the first decoder; a second decoder for decoding the pre-pit signal outputted from the removing device; a second counter for counting the number of detection errors in the second decoder; a comparator for comparing the numbers of detection errors respectively outputted by the first and second counters; and a multiplexer for selectively outputting either one of the outputs of the first and second decoders on the basis of a comparison result of the comparator.

According to this aspect, the pre-pit detection signal outputted from the pre-pit signal detecting device is decoded by the first decoder. Then, the number of detection errors in the first decoder is counted by the first counter. On the other hand, the pre-pit signal outputted from the removing device is decoded by the second decoder. Then, the number of detection errors in the second decoder is counted by the second counter. Then, the numbers of detection errors respectively outputted by the first and second counters are compared by the comparator. Finally, either one of the outputs of the first and second decoders is selectively outputted by the multiplexer, on the basis of a comparison result of the comparator.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments in the present invention will be explained below with reference to the drawings.

Figure 1:
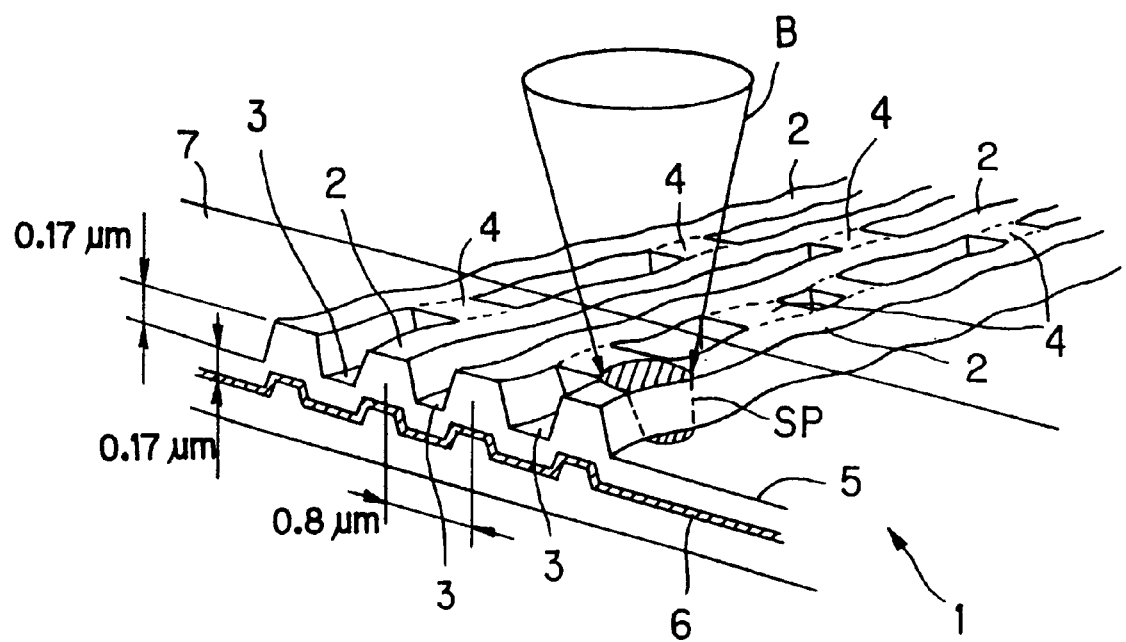
FIG. 1 is a perspective view showing an example of a configuration of DVD-R used in embodiments of the present invention.

At first, a configuration of DVD-R is described. FIG. 1 is a perspective view showing an example of a configuration of the DVD-R used in embodiments of the present invention.

In FIG. 1, a DVD-R 1 is a dye type having a dye film 5 to which information can be written only once. There are formed on the DVD-R 1 a groove track 2 as an information record track and a land track 3 as a guide track for guiding a light beam B such as a laser beam and the like as a reproduction light or a record light onto the groove track 2.

Moreover, the DVD-R 1 is provided with a protection film 7 for protecting them and a metallic evaporation film 6 for reflecting the light beam B when the recorded information is reproduced. Then, a pre-pit 4 corresponding to pre-information on the DVD-R is formed on the land track 3. This pre-pit 4 is formed in advance in a process of manufacturing the DVD-R 1.

Moreover, in the DVD-R 1, the groove track 2 is wobbled at a frequency corresponding to a rotation speed of the DVD-R 1. Rotation control information by the operation of wobbling the groove track 2 is recorded in advance in the process of manufacturing the DVD-R 1, similarly to the pre-pit 4.

Then, when recording record information (hereafter, this implies information, such as video information, audio information and the like, to be primarily recorded, except the pre-information) onto the DVD-R 1, in an information recording apparatus described later, a wobbling frequency of the groove track 2 is detected to thereby obtain the rotation control information and then control the rotation of the DVD-R 1 at a predetermined rotation speed, and the pre-pit 4 is also detected to thereby obtain the pre-information of the DVD-R 1 in advance of the actual recording operation. Then, an optimum output of the light beam B serving as the record light or the reproduction light is set in accordance with the optimum output information included in the pre-information, and further, the record information is recorded at a corresponding record position in accordance with the address information included in the pre-information.

Here, the record information is recorded by emitting the light beam B onto the DVD-R 1 such that a center of the light beam B coincides with a center of the groove track 2, and then forming a record information pit corresponding to the record information on the groove track 2. At this time, a size of a light spot SP is set such that the light spot SP is emitted not only onto the groove track 2 but also partially onto the land track 3, as shown in FIG. 1.

Then, the reflection light of the light spot SP emitted on the groove track 2 and the land track 3 is used to detect a composite signal, in which the pre-pit signal is superimposed on the wobbling signal, by means of a push-pull method (i.e., a push-pull method using light detectors divided with respect to a division line optically parallel to the rotation direction of the DVD-R 1 (hereafter, it is referred to as a radial push-pull method)). Moreover, the pre-information is detected from the pre-pit signal component in the composite signal to then obtain the pre-information and also obtain a clock signal for the rotation control from the wobbling signal component.

Figure 2:
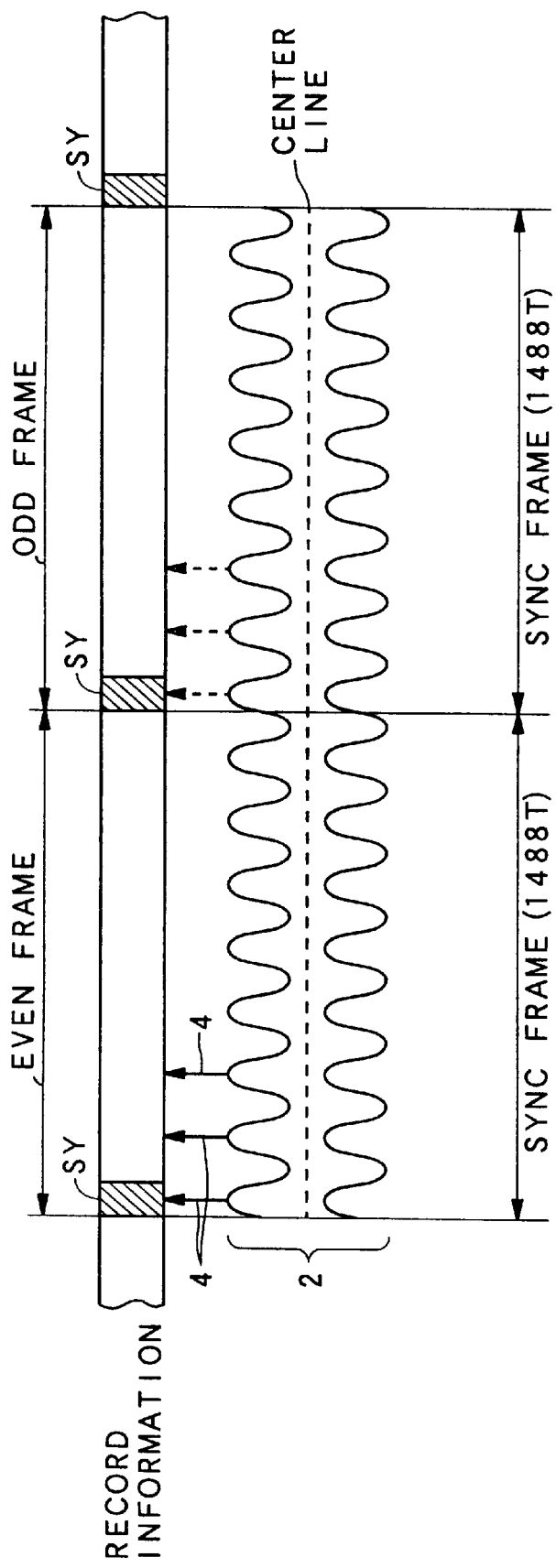
FIG. 2 is a diagram showing an example of a record format on the DVD-R of FIG. 1.

Next, a record format of the rotation control information and the pre-information recorded in advance on the DVD-R 1 of this embodiment will be described below with reference to FIG. 2. In FIG. 2, an upper stage shows the record format in the record information, and wave forms at lower stages show the wobbling condition of the groove track 2 in which the record information is recorded (corresponding to a plan view of the groove track 2). In FIG. 2, the upward arrows between the wobbling condition of the groove track 2 and the record information diagrammatically show the positions at which the pre-pits 4 are formed respectively. The wobbling condition of the groove track 2 is illustrated by using an amplitude higher than an actual amplitude, for easy understanding. The record information is recorded on a center line of the groove track 2.

As shown in FIG. 2, the record information recorded on the DVD-R 1 in this embodiment is divided in advance for each synchronization frame as an information unit. Then, one recording sector is provided with 26 synchronization frames. Moreover, one ECC (Error Correcting Code) block is provided with 16 recording sectors. In addition, the synchronization frame has a length equal to 1488 times (1488T) of a unit length (hereafter, referred to as T) corresponding to a bit interval determined by the record format when recording the record information. Moreover, synchronization information $S_Y$ to establish the synchronism for each synchronization frame is recorded in a portion having a lead 14T length of the synchronization frame.

On the other hand, the pre-information recorded on the DVD-R 1 in this embodiment is recorded for each synchronization frame. Here, when recording the pre-information by means of the pre-pit 4, one pre-pit 4 which is intended to represent a synchronization signal in the pre-information is formed on the land track 3 adjacent to an area in which the synchronization information $S_Y$ in each synchronization frame of the record information is recorded. Moreover, one or two pre-pits 4 for carrying the content (address information and the like) of the pre-information to be recorded are formed on the land track 3 adjacent to a former portion within the synchronization frame other than the synchronization information $S_Y$ (in addition, as for the former portion within the synchronization frame other than the synchronization information $S_Y$, there may be a case that the pre-pit 4 is not formed, depending on the content of the pre-information to be recorded).

On this occasion, in this embodiment, the pre-pit 4 is formed in only an even-numbered synchronization frame (hereafter, referred to as an EVEN frame) or only an odd-numbered synchronization frame (hereafter, referred to as an ODD frame), in the single recording sector, so that the pre-information is recorded. That is, in FIG. 2, if the prepit 4 is formed in the EVEN frame (this situation is illustrated by the upward arrows of solid lines in FIG. 2), the pre-pit 4 is not formed on the ODD frames located before and after that EVEN frame.

On the other hand, the groove track 2 is wobbled at a standard wobbling frequency f0 of 140 kHz (i.e., a frequency in which a single synchronization frame corresponds to 8 waves) over all the synchronization frames. Then, in a pre-pit detecting apparatus described later, the wobbling frequency is detected from a disc which is being rotated, and a signal for controlling a rotation of a spindle motor is detected.

Next, a first embodiment of the present invention will be described below with reference to FIGS. 3 to 5.

Incidentally, in the following explanation, a pre-pit detecting apparatus applied to an information recording apparatus for recording digital information sent from a host computer onto the DVD-R 1 is explained as the first embodiment.

At first, the whole configuration of the information recording apparatus of the first embodiment and the operations of respective configuration blocks are explained. Incidentally, in this embodiment, the pre-pit 4 including the address information etc., and the wobbled groove track 2 are formed in advance on the DVD-R 1. When the digital information is recorded, the pre-pit 4 is detected in advance to thereby obtain the address information on the DVD-R 1 and accordingly detect a record position on the DVD-R 1, at which the digital information is to be recorded. Then, the digital information is actually recorded at the detected record position.

Figure 3:
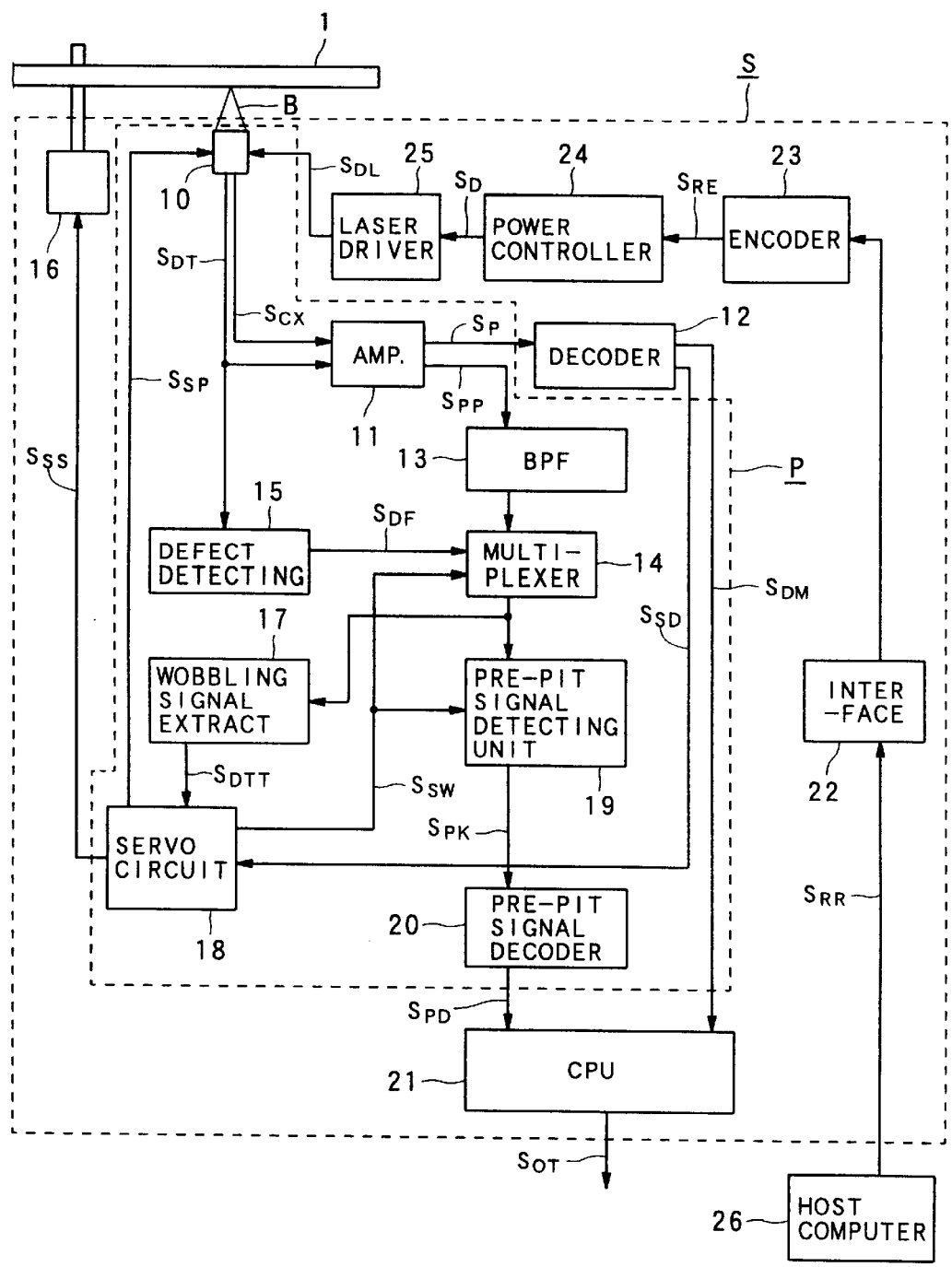
FIG. 3 is a block diagram showing a whole configuration of an information recording apparatus S as a first embodiment of the present invention.

As shown in FIG. 3, an information recording apparatus S is provided with an optical pickup 10, a reproduction amplifier 11 servicing as a composite signal extracting device, a decoder 12, a band pass filter (BPF) 13, a multiplexer 14 serving as a relaying device, a defect detecting unit 15 servicing as a defect detecting device, a spindle motor 16, a wobbling signal extracting unit 17 serving as a wobbling extracting device, a servo circuit 18 for controlling a rotation of the spindle motor 16 and controlling a movement of the optical pickup 10, a pre-pit signal detecting apparatus 19 serving as a pre-pit detecting device, a pre-pit signal decoder 20, a processor (CPU) 21, an interface 22, an encoder 23, a power controller 24 and a laser driver 25. Moreover, digital information $S_{RR}$ to be recorded is inputted from the external host computer 26 through the interface 22 to the information recording apparatus S.

In addition, a pre-pit detecting unit P is constituted by the optical pickup 10, the reproduction amplifier 11, the BPF 13, the multiplexer 14, the defect detecting unit 15, the wobbling signal extracting unit 17, the servo circuit 18, the pre-pit signal detecting apparatus 19 and the pre-pit signal decoder 20, in the information recording apparatus S.

Next, the operations of the respective blocks constituting the information recording apparatus S will be described below by mainly using FIGS. 3 and 4. FIG. 4 shows the pre-pit detecting unit P shown in FIG. 3 by using the further actual configuration blocks.

At first, the interface 22 performs, with respect to the digital information $S_{RR}$ sent from the host computer 26, an interface operation for reading the digital information $S_{RR}$ into the information recording apparatus S, under the control of the CPU 21, and then outputs the digital information $S_{RR}$ to the encoder 23.

The encoder 23 is provided with an ECC generator, an 8–16 modulating unit, a scrambler and the like which are not illustrated, and prepares the ECC block that is a unit when an error correction is carried out at a time of reproduction, in accordance with the digital information $S_{RR}$, and also performs an interleave, an 8–16 modulation and a scrambling process with respect to the ECC block, and then generates a modulation signal $S_{RE}$.

The power controller 24, when the modulation signal $S_{RE}$ is sent thereto, outputs a record signal $S_D$ for controlling an output of the laser diode (not shown) within the optical pickup 10, in accordance with the modulation signal $S_{RE}$. Also, when the modulation signal $S_{RE}$ is not sent thereto, the power controller 24 outputs the record signal $S_D$ for setting an output level of the light beam B emitted by the laser diode in the optical pickup 10 to a constant low level (i.e., a reproduction power level).

The laser driver 25 outputs to the optical pickup 10 a laser drive signal $S_{DL}$ for actually driving the laser diode so as to emit the light beam B.

The optical pickup 10 includes the above mentioned laser diode, a polarization beam splitter, an objective lens, a light detecting unit and the like which are not illustrated, and emits the light beam B onto an information recording surface of the DVD-R 1 in accordance with the laser drive signal $S_{DL}$, and thereby records the digital information $S_{RR}$ to be recorded onto the DVD-R 1. The optical pickup 10 also extracts a composite signal $S_{CX}$ including the information corresponding to the wobbling frequency of the groove track 2 and the pre-pit 4 by the radial push-pull method in accordance with the reflection light from the DVD-R 1 of the light beam B, and then outputs the composite signal $S_{CX}$ to the reproduction amplifier 11. Moreover, the optical pickup 10 outputs a total signal (which becomes a so-called RF (Radio Frequency) signal) of the reflection light from the information recording surface of the light beam B as a detection signal SDT to the reproduction amplifier 11 and the defect detecting unit 15.

Incidentally, the composite signal SCX is a signal in which the wobbling signal of the groove track 2 and the pre-pit signal based on the pre-pit 4 on the land track 3 adjacent to the groove track 2 are superimposed with each other.

The reproduction amplifier 11 amplifies the composite signal SCX, and then outputs a pre-information signal SPP corresponding to the wobbling frequency of the groove track 2 and the pre-pit 4, and also amplifies the detection signal SDT, to output it as an amplification signal SP to the decoder 12.

The decoder 12 performs an 8–16 demodulation and a de-interleave with respect to the amplification signal SP, and thereby decodes the amplification signal SP, and then outputs a demodulation signal SDM and a servo demodulation signal SSD to send them to the CPU 21 and the servo circuit 18 respectively.

The defect detecting unit 15 outputs a defect pulse signal SDF to the multiplexer 14 if a defect is detected from the sent detection signal SDT. Actually explaining, as shown in FIG. 4, the defect detecting unit 15 is provided with a peak holding circuit 15a, a peak holding circuit 15b having a time constant longer than that of the peak holding circuit 15a, a level adjusting unit 15c for adjusting an amplitude level of an output signal from the peak holding circuit 15b, and a comparator 15d for comparing a level of an output signal from the peak holding circuit 15a with a level of an output signal from the level adjusting unit 15c.

The peak holding circuit 15a holds a peak level of the sent detection signal SDT for a period corresponding to a set time constant. Such a time constant is determined in accordance with the smallest defect among the defects needing the compensation according to the present invention. For example, it is set to approximately several µs. Since this time constant is set, an envelop signal S15a of the detection signal SDT, in which the amplitude level is reduced substantially following the occurrence of the defect, is outputted from the peak holding circuit 15a to a non-inverting input terminal of the comparator 15d.

On the other hand, the time constant set in the peak holding circuit 15b is sufficiently larger than the time constant set in the peak holding circuit 15a such that the detection is sufficiently enabled by a later-described detecting method, even for the largest defect among the defects needing the compensation according to the present invention. For example, it is set to approximately several ms. Since this time constant is set, an envelop signal S15b of the detection signal SDT, in which the reduction of the amplitude level substantially delayingly follow the occurrence of the defect, is outputted from the peak holding circuit 15b to the level adjusting unit 15c.

In the condition that the defect does not occur, the level adjusting unit 15c carries out the adjustment so as to set the amplitude level of the envelop signal S15b sent by the peak holding circuit 15b to be slightly lower than the amplitude level of the envelop signal S15a outputted by the peak holding circuit 15a. After that, the level adjusting unit 15c outputs the adjusted envelop signal S15c to an inverting input terminal of the comparator 15d.

Then, the comparator 15d compares the sent envelop signals S15a and S15c with each other. If the defect does not occur, both of the peak holding circuits 15a and 15b continue to hold the peak levels of the detection signals SDT. The level adjusting unit 15c sets the envelop signal S15b outputted by the peak holding circuit 15b to be slightly lower in amplitude level than the envelop signal S15a. Thus, a signal of an H level is outputted by the comparator 15d.

On the other hand, if the defect occurs, since the time constant of the peak holding circuit 15a is short as mentioned above, the amplitude level of the envelop signal S15a is reduced immediately following the occurrence of the defect. However, since the time constant of the peak holding circuit 15b is sufficiently long, the amplitude level of the envelop signal S15c is not reduced immediately following the occurrence of the defect. Hence, the comparator 15d outputs the defect pulse signal SDF having an L level corresponding to a period (between times t1 and t2) for which the defect occurs as shown in at a wave form (c) of FIG. 5, to the multiplexer 14.

The multiplexer 14 carries a function as a so-called switch, with the defect pulse signal SDF as a control signal. If the defect detecting unit 15 does not detect the defect from the defect pulse signal SDF, namely, if the defect pulse signal SDF of the above-mentioned H level is sent by the defect detecting unit 15, the multiplexer 14 selects the pre-information signal SPP in which the noise component is removed by the BPF 13 and which is outputted by the reproduction amplifier 11. On the other hand, if the defect detecting unit 15 detects the defect, namely, if the defect pulse signal SDF of the L level is sent, the multiplexer 14 selects a later-described synchronization wobbling signal SSW outputted by the servo circuit 18, instead of the output of the BPF 13, and then relays and outputs the synchronization wobbling signal SSW to the wobbling signal extracting unit 17 and the pre-pit signal detecting apparatus 19.

Figure 4:
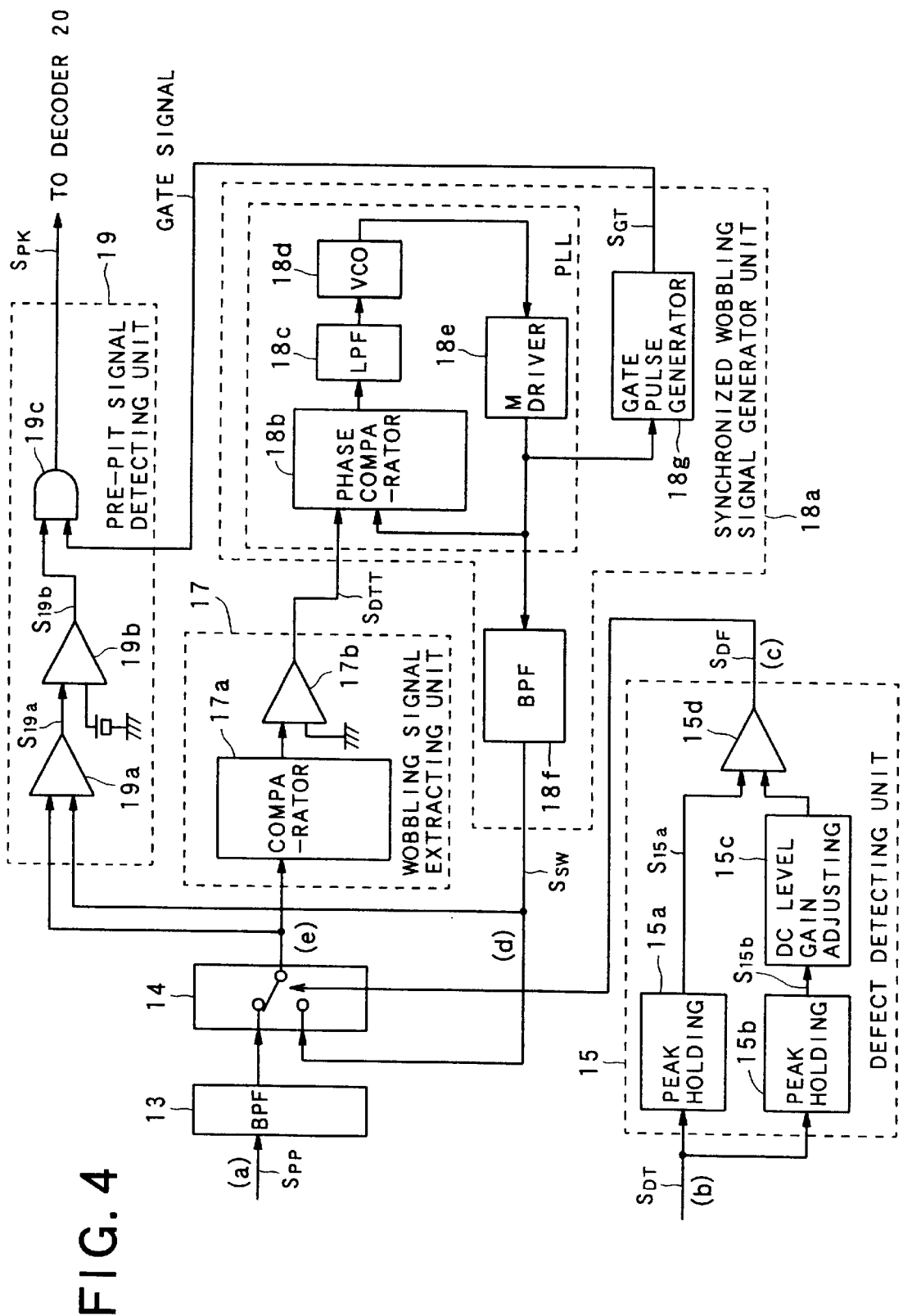
FIG. 4 is a block diagram showing a main configuration of a pre-pit detecting unit P in the first embodiment.

As shown in FIG. 4, the wobbling signal extracting unit 17 is provided with a wobbling detecting unit 17a composed of a band pass filter with a standard wobbling frequency f0 as a central frequency and the like, and a comparator 17b for converting a detection wobbling signal detected by the wobbling detecting unit 17a into a binary value. Then, the wobbling signal extracting unit 17 extracts a wobbling frequency component included in either one selected signal of the synchronization wobbling signal SSW and the pre-information signal SPP which are relayed and outputted by the multiplexer 14, and sends it to the servo circuit 18 as an extraction wobbling signal SDTT.

The servo circuit 18 outputs a pickup servo signal SSP for a focus servo control and a tracking servo control in the pickup 10, in accordance with the servo demodulation signal SSD sent by the decoder 12. Also, the servo circuit 18 uses the wobbling frequency included in the extraction wobbling signal SDTT, and then outputs a spindle servo signal SSS so as to control the rotation of the spindle motor 16. Moreover, the servo circuit 18 has a synchronized wobbling signal generating unit 18a, and outputs the synchronization wobbling signal SSW whose phase is synchronous with that of the extraction wobbling signal SDTT sent by the wobbling signal extracting unit 17, to the multiplexer 14 and the pre-pit signal detecting apparatus 19.

Here, the synchronized wobbling signal generating unit 18a is actually described.

As shown in FIG. 4, the synchronized wobbling signal generating unit 18a is provided with: a PLL circuit having a phase comparator 18b, an LPF (Low Pass Filter) 18C, a VCO (Voltage Controlled Oscilatter) 18d and a divider 18e; a BPF (Band Pass Filter) 18f for smoothing a pulse signal outputted by the PLL circuit and making it into a sine wave signal; and a gate pulse generator 18g.

The PLL circuit synchronizes an oscillation frequency Nf0 of the VCO 18d with the frequency of the extraction wobbling signal S_DTT. The divider 18e divides the oscillation frequency Mf0 by M. Then, the BPF 18f smoothes the pulse signal having the period of the wobbling signal. After that, it is outputted to the multiplexer 14 and the pre-pit signal detecting apparatus 19 as the synchronization wobbling signal Ssw.

Figure 10:
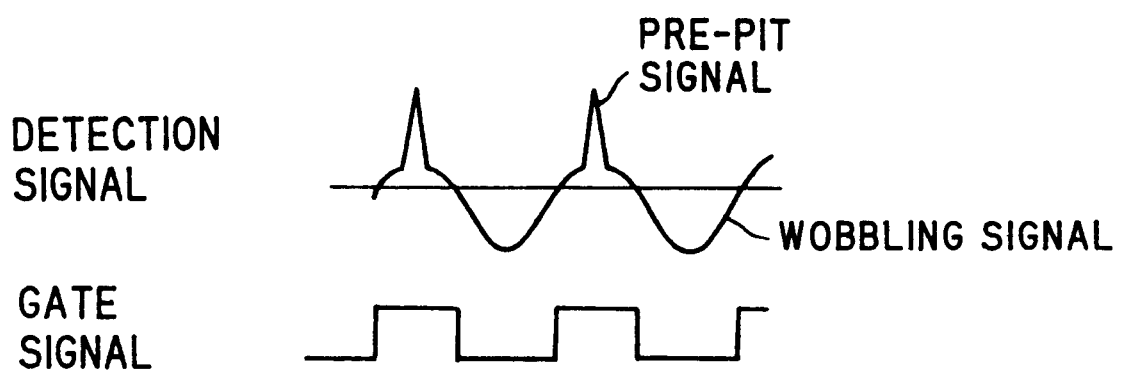
FIG. 10 is a diagram showing wave forms of a reproduction signal and a gate signal to explain one method of detecting a pre-pit signal.

An output from the PLL circuit is also outputted to the gate pulse generator 18g. The gate pulse generator 18g generates a gate signal having a period of a wobbling signal shown in FIG. 10, in accordance with this output from the PLL circuit, and then outputs the gate signal to a later-described logical product circuit (AND) 19c comprised by the pre-pit signal detecting apparatus 19.

The pre-pit signal detecting apparatus 19 detects a pre-pit signal, in accordance with the pre-information signal S_PP outputted by the multiplexer 14 and the synchronization wobbling signal Ssw outputted by the servo circuit 18, and then outputs the detected pre-pit signal as a pre-pit detection signal S_PK to the pre-pit signal decoder 20.

Here, an actual configuration of the pre-pit signal detecting apparatus 19 is described with reference to FIG. 4.

As shown in FIG. 4, the pre-pit signal detecting apparatus 19 is provided with a multiplier 19a serving as a modulating device, a comparator 19b and a logical product circuit (AND) 19c.

The multiplier 19a amplitude-modulates the pre-information signal S_PP outputted by the multiplexer 14, in accordance with the synchronization wobbling signal Ssw outputted by the synchronized wobbling signal generating unit 18a. In order to easily detect the pre-pit signal from the pre-information signal S_PP, the multiplier 19a emphasizes an amplitude of the abdominous portion of the wobbling signal on which the pre-pit signal component is superimposed in the pre-information signal S_PP, and also reduces amplitudes in the other portions. This amplitude-modulated signal S19a is outputted to the comparator 19b, and is compared with a threshold Vth for detecting the pre-pit, and is then sent to the AND circuit 19c.

Then, the AND circuit 19c calculates the logical product of the gate signal sent by the gate pulse generator 18g and the pulse signal S19b outputted by the comparator 19b, and then outputs the pulse signal S19b as the pre-pit detection signal S_PK to the pre-pit signal decoder 20, when the pulse signal S19b is sent in a period while the gate is opened (in the H level).

In addition, the operation with regard to the pre-pit signal detecting apparatus 19 is described in detail in Japanese Patent Application Laid Open Hei. 9-130061).

The pre-pit signal decoder 20 demodulates the sent pre-pit detection signal S_PK, and then generates a demodulation pre-pit signal S_PD, and further outputs it to the CPU 21.

Finally, the CPU 21 uses the demodulation pre-pit signal S_PD inputted before the digital information S_RR is recorded on the DVD-R 1, and then obtains the address information, and further controls the operation of recording the digital information SRR at a position on the DVD-R 1 corresponding to this address information. Also, the CPU 21 outputs to the external portion a reproduction signal S_OT corresponding to the digital information already recorded on the DVD-R 1 in accordance with the inputted demodulation signal S_DM, and further controls the information recording apparatus S as a whole.

Next, the actual operation of the pre-pit detecting unit P will be described below with reference to FIG. 5. FIG. 5 is a time chart of the wave forms in the main portions of the pre-pit detecting unit P shown in FIG. 4.

Figure 5:
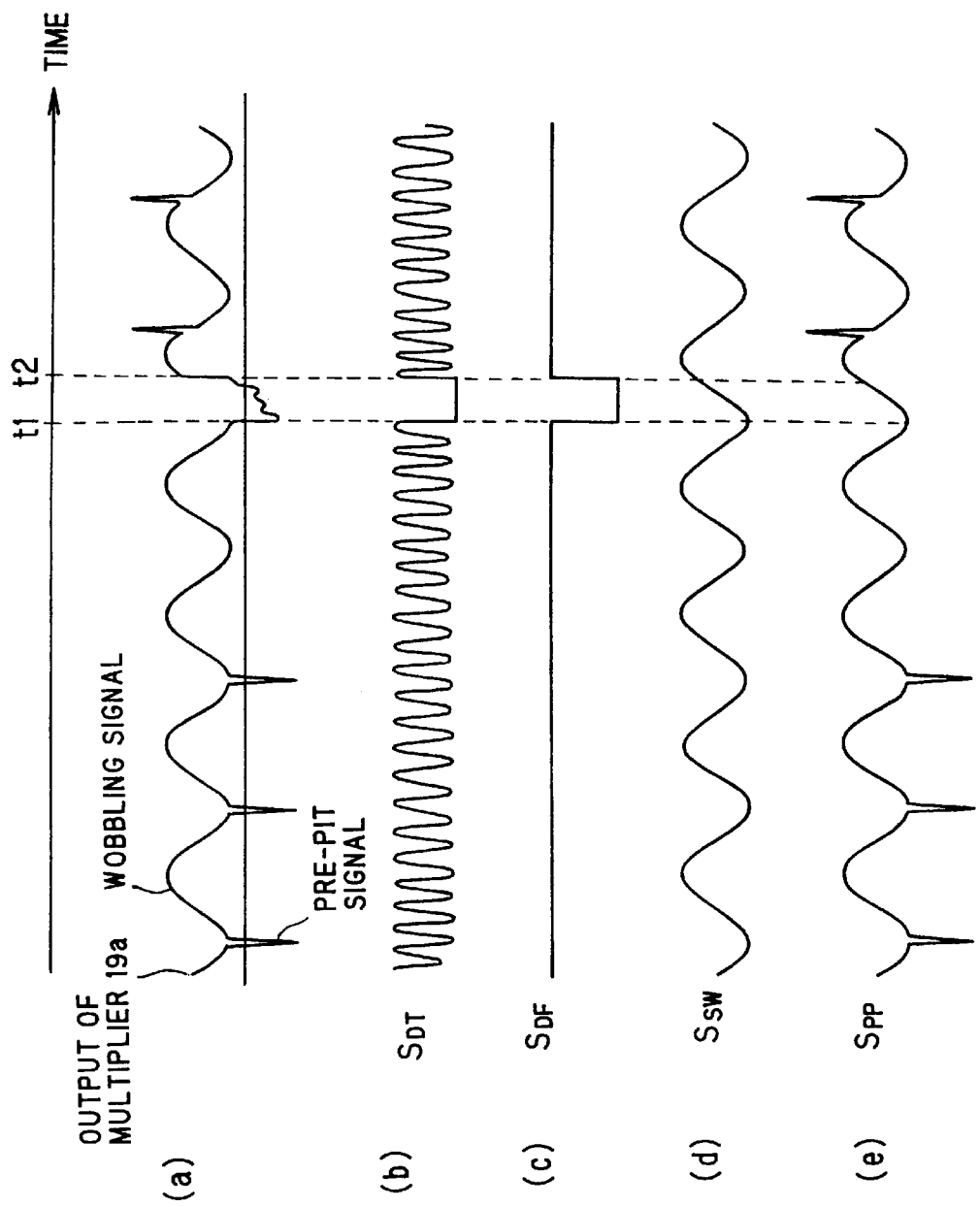
FIG. 5 is a timing chart showing a wave form of a signal in each section of the pre-pit detecting unit P in the first embodiment.

At first, if the defect detecting unit 15 does not detect the defect in the detection signal S_DT (in the period before the time t1 or the period after the time t2 in FIG. 5, the defect detection signal S_DF is in the H level), the multiplexer 14 outputs the pre-information signal S_PP as shown in wave forms (a) to (e) in FIG. 5, in order to selectively output the pre-information signal S_PP sent through the BPF 13.

On the other hand, if the defect detecting unit 15 detects the defect in the pre-information signal S_PP (in the period between the time t1 and the time t2 in FIG. 5, the defect detection signal S_DF is in the L level), the multiplexer 14 selectively outputs the synchronization wobbling signal Ssw instead of the pre-information signal S_PP. That is, as shown at a wave form (e) of FIG. 5, the signal which serves as the pre-information signal S_PP until the time t1 is replaced with the synchronization wobbling signal Ssw (at a wave form (d) of FIG. 5) only for the period while the defect is detected.

In this way, the portion of the noise occurrence resulting from the defect (the noise brought about in the period between the times t1 and t2 at the wave form (a) of FIG. 5) is replaced with the synchronization wobbling signal Ssw which is sent by the PLL circuit in the synchronized wobbling signal generating unit 18a and is not affected by the defect. Thus, the portion of the noise occurrence resulting from the defect becomes in the noiseless situation. Hence, there is no case that the pre-pit signal detecting apparatus 19 at the later stage erroneously detects the portion of the noise occurrence resulting from the defect as the pre-pit.

Also, the synchronization wobbling signal Ssw is sent to the synchronized wobbling signal generating unit 18a, in the period of the defect occurrence (the period between the times t1 and the t2). Thus, the synchronism is not disturbed by the defect in this period. When the supply of the pre-information signal S_PP is resumed (namely, after the time t1), it is possible to instantly bring into a phase of such a pre-information signal S_PP.

Next, a second embodiment of the pre-pit detecting unit P in the present invention will be described below with reference to FIGS. 6 to 9.

Figure 6:
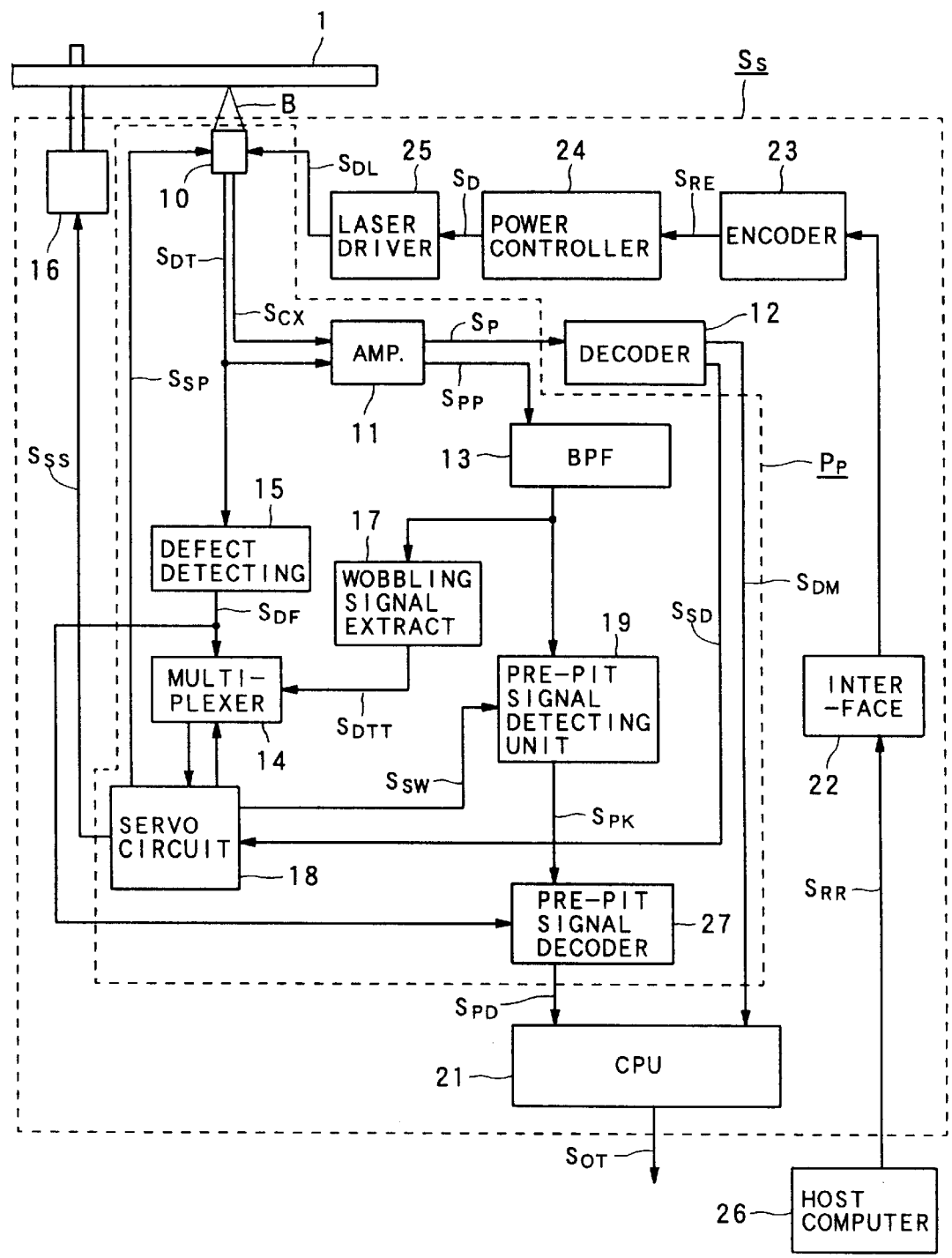
FIG. 6 is a block diagram showing a whole configuration of an information recording apparatus S as a second embodiment of the present invention.

FIG. 6 is a block diagram showing a whole configuration of an information recording apparatus Ss including the pre-pit detecting unit P that as the second embodiment in the present invention. In addition, the constitutional elements same as those of the information recording apparatus S shown in FIG. 3 carry the same reference numerals and the detailed explanations thereof are omitted.

In the information recording apparatus Ss shown in FIG. 6, the pre-pit detecting unit Pp is provided with an optical pickup 10, a reproduction amplifier 11, a BPF 13, a multiplexer 14, a defect detecting unit 15, a wobbling signal extracting unit 17, a servo circuit 18, a pre-pit signal detecting apparatus 19 and a pre-pit signal decoder 27.

In the second embodiment, the multiplexer 14 is constituted as follows. That is, it is mounted at a later stage of the wobbling signal extracting unit 17, and then uses a defect pulse signal S_DF outputted by the defect detecting unit 15 as a control signal, and selectively switches a pulse wobbling signal S_WP having the same phase as the synchronization wobbling signal Ssw outputted by a synchronized wobbling signal generating unit 18a and an extraction wobbling signal S_DTT, and further relays and outputs it to the synchronized wobbling signal generating unit 18a.

The defect pulse signal S_DF outputted by the defect detecting unit 15 is also sent to the pre-pit signal decoder 27, and is used to validate certainty of a later-described pre-pit detection signal S_PD.

Figure 7:
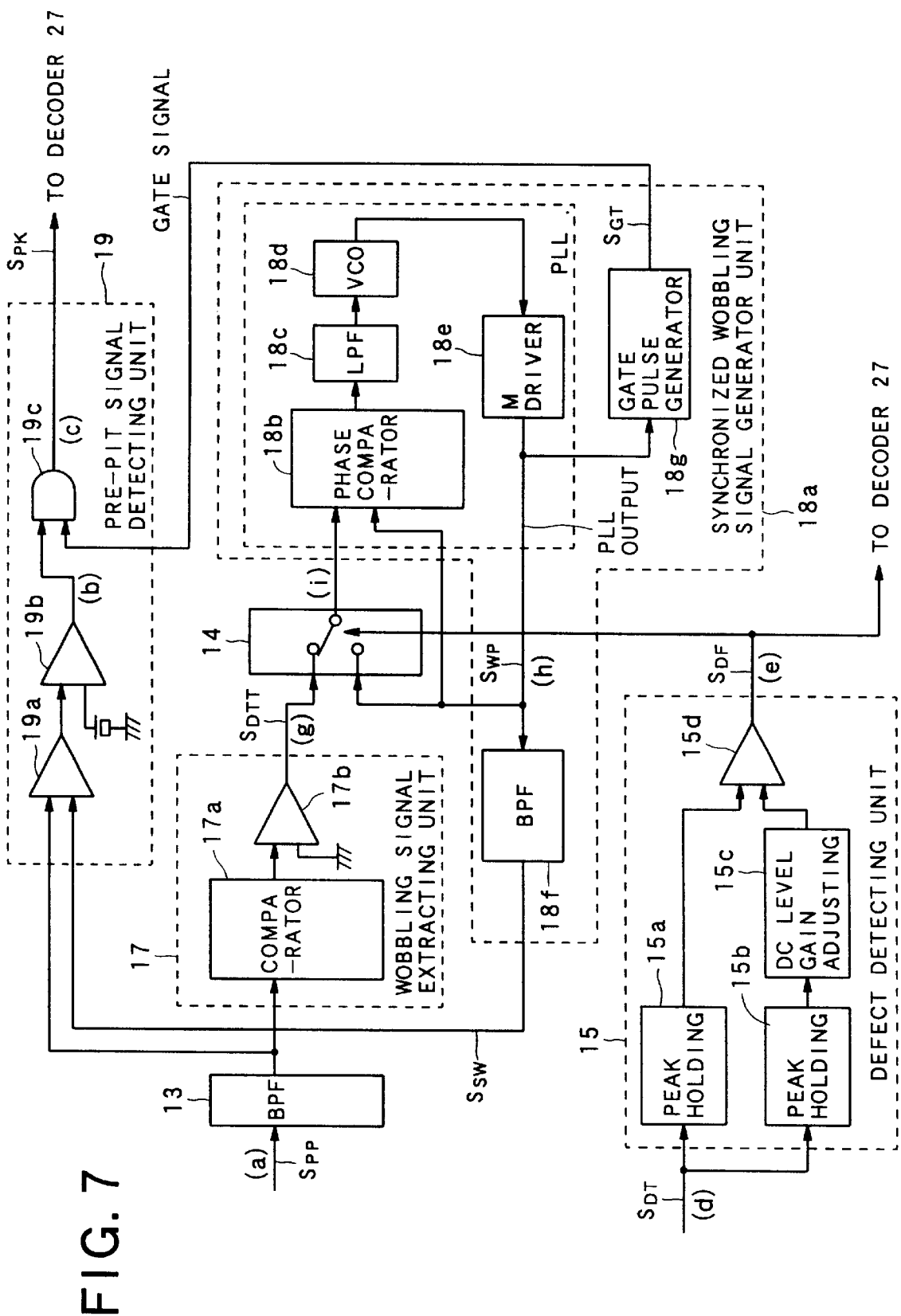
FIG. 7 is a block diagram showing a main configuration of a pre-pit detecting unit Pp in the second embodiment.
Figure 8:
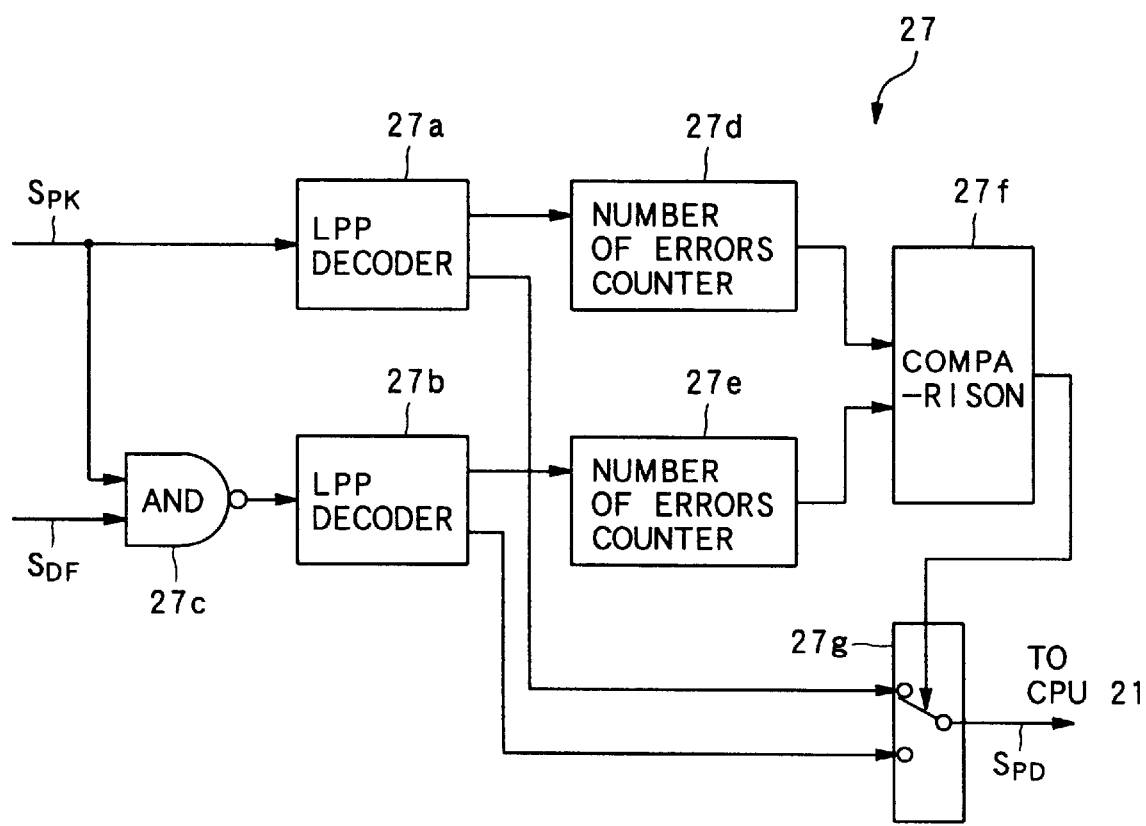
FIG. 8 is a detailed block diagram of a decoder of the pre-pit detecting unit Pp in the second embodiment.

FIGS. 7 and 8 show an actual configuration of the pre-pit detecting unit Pp.

In FIGS. 7 and 8, the defect detecting unit 15, if detecting the defect from the sent detection signal S$_{DT}$, sends the defect pulse signal S$_{DF}$ of the L level to the multiplexer 14 and the pre-pit signal decoder 27.

If the defect detecting unit 15 does not detect the defect (the defect pulse signal S$_{DF}$ is in the L level), the multiplexer 14 relays and outputs the extraction wobbling signal S$_{DTT}$ from the wobbling signal extracting unit 17 to the servo circuit 18. If the defect detecting unit 15 detects the defect (the defect pulse signal S$_{DF}$ is in the H level), the multiplexer 14 selects the pulse wobbling signal S$_{WP}$ that is the output signal from the PLL circuit in the synchronized wobbling signal generating unit 18a, instead of the extraction wobbling signal S$_{DTT}$ sent by the wobbling signal extracting unit 17, and then outputs the pulse wobbling signal S$_{WP}$ to the servo circuit 18.

Moreover, the pre-pit signal detecting apparatus 19 uses the synchronization wobbling signal S$_{SW}$ and the pre-information signal S$_{PP}$ sent through the BPF 13, and then detects the pre-pit, and further outputs the pre-pit detection signal S$_{PK}$ to the pre-pit signal decoder 27.

FIG. 8 shows an actual configuration of the pre-pit signal decoder 27. As shown in FIG. 8, the pre-pit signal decoder 27 is provided with: a decoder 27a to which the pre-pit detection signal S$_{PK}$ is directly sent and which data-decodes the pre-pit detection signal S$_{PK}$ at a predetermined amount unit (for example, corresponding to one ECC block in which the pre-pit can be decoded); a counter 27d for counting the number of detection errors detected at the time of the decoding operation in the decoder 27a; a logical product (AND) circuit 27c which calculates a logical product of the pre-pit detection signal S$_{PK}$ and the defect pulse signal S$_{DF}$ and also serves as a removing device for removing a pre-pit signal detected at a time of an occurrence of the defect; a decoder 27b for decoding an output signal from the logical product circuit 27c as the pre-pit detection signal at the predetermined amount unit; a counter 27e for counting the number of detection errors detected at the time of the decoding operation in the decoder 27b; a comparator 27f for comparing the numbers of detection errors which are respectively outputted by the counter 27d and the counter 27e; and a multiplexer 27g for selectively sending to the CPU 21 either one of the outputs of the decoder 27a and the decoder 27b in accordance with the output signal from the comparator 27f.

Figure 9:
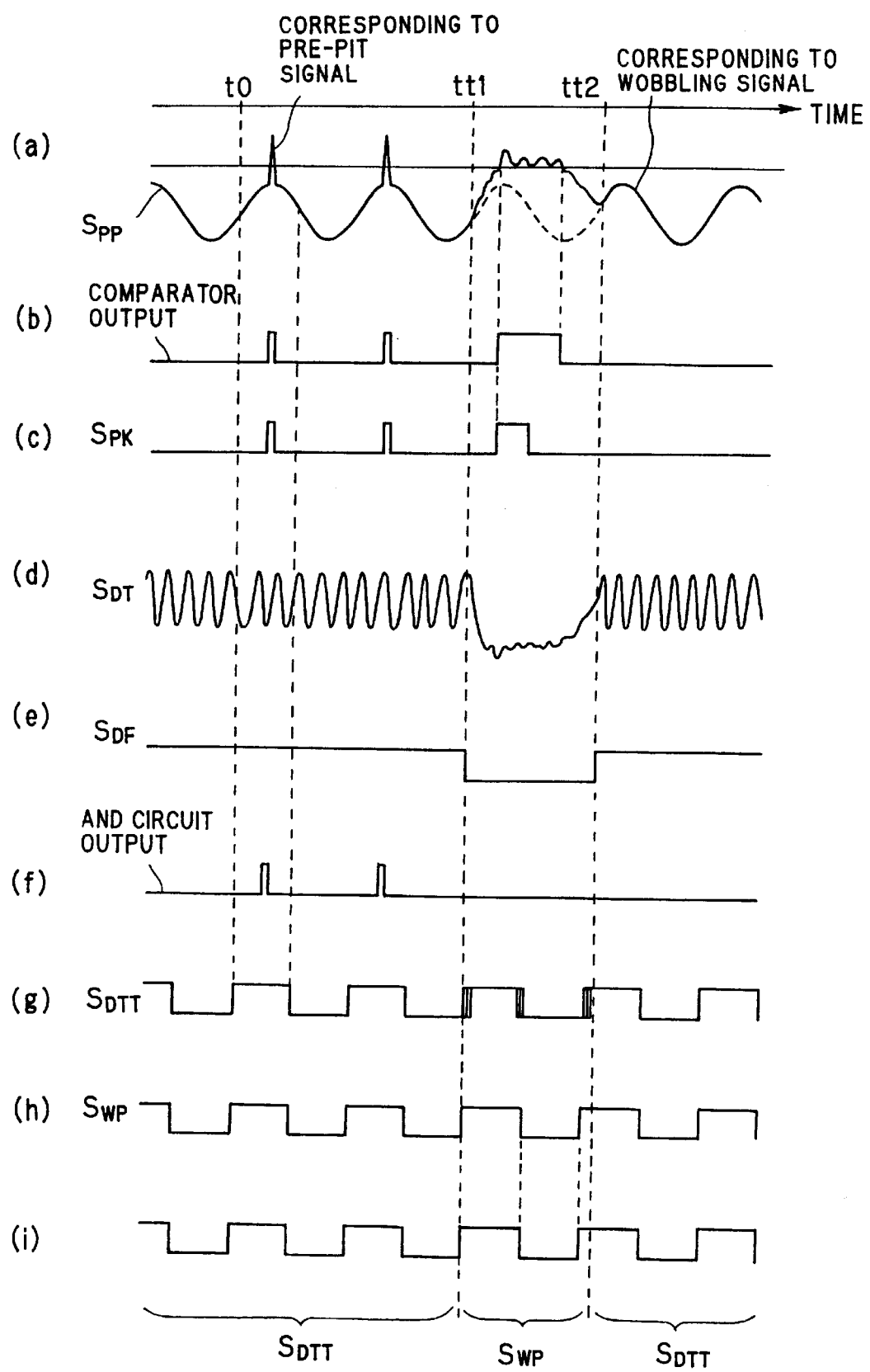
FIG. 9 is a timing chart showing a wave form of a signal in each section of the pre-pit detecting unit Pp in the second embodiment.

The operations in case that the pre-pit detecting unit Pp having the above-mentioned configuration detects the pre-pit will be described below FIG. 9. FIG. 9 is a timing chart showing the wave forms of the main portions of the pre-pit detecting unit Pp shown in FIG. 7.

At first, if the defect detecting unit 15 does not detect the defect in the detection signal S$_{DT}$ (in the period before a time tt11 1 or the period after a time tt2 in FIG. 9, the defect pulse signal S$_{DF}$ is in the H level), the multiplexer 14 sends the extraction wobbling signal S$_{DTT}$, as it is, to the synchronized wobbling signal generating unit 18a, as shown in wave forms (g) to (i) of FIG. 9, in order to selectively output the extraction wobbling signal S$_{DTT}$ sent through the wobbling signal extracting unit 17. Then, the synchronized wobbling signal generating unit 18a outputs the synchronization wobbling signal S$_{SW}$ whose phase is synchronous with that of the sent extraction wobbling signal S$_{DTT}$, to the multiplier 19a in the pre-pit signal detecting apparatus 19, and also outputs a gate signal S$_{GT}$ whose phase is synchronous with that of the extraction wobbling signal S$_{DTT}$, to the logical product circuit 19c.

On the other hand, if the defect detecting unit 15 detects the defect in the detection signal S$_{DT}$ (between the time tt1 and the time tt2 in FIG. 9, the defect pulse signal S$_{DF}$ is in the L level), the multiplexer 14 selectively outputs the wobbling pulse signal S$_{WP}$, instead of the extraction wobbling signal S$_{DTT}$. That is, as shown in a wave form (i) of FIG. 9, the signal which serves as the extraction wobbling signal S$_{DTT}$ until the time tt1 is replaced with the wobbling pulse signal S$_{WP}$ (at a wave form (h) of FIG. 9) only for the period while the defect is detected.

Thus, the synchronized wobbling signal generating unit 18a can generate the synchronization wobbling signal S$_{SW}$ and the gate signal S$_{GT}$ without receiving the influence of the defect. Hence, the continuous synchronization wobbling signal S$_{SW}$ is sent to the multiplier 19a in the pre-pit signal detecting apparatus 19, and also the continuous gate signal S$_{GT}$ is sent to the logical product circuit 19c. Then, the pre-pit signal detecting apparatus 19 carries out the operation of detecting the pre-pit signal, irrespectively of the occurrence of the defect, in accordance with the sent synchronization wobbling signal S$_{SW}$ and the gate signal S$_{GT}$, and then outputs the pre-pit detection signal S$_{PK}$ as the pre-pit signal to the decoder 27.

On the other hand, the defect pulse signal S$_{DF}$ is sent to one input terminal of the logical product circuit 27c in the pre-pit signal decoder 27. The pre-pit detection signal S$_{PK}$ is inputted to the other input terminal of the logical product circuit 27c. Thus, the logical product circuit 27c sends the pre-pit detection signal S$_{PK}$ to the decoder 27b, only if the pre-pit detection signal S$_{PK}$ is sent by the pre-pit signal detecting unit in the period while the defect detection signal S$_{DF}$ is in the H level, namely, in the period while the defect does not occur. Moreover, the pre-pit detection signal S$_{PK}$ outputted by the pre-pit signal detecting apparatus 19 is sent directly to the decoder 27a. That is, the detected pre-pit signal S$_{P}$ is sent irrespectively of the occurrence of the defect.

Hence, there may be a case that the decoder 27a erroneously detects a noise signal, which is not an original pre-pit, as a pre-pit because of the occurrence of the defect and that the decoder 27b does not detect as the original pre-pit because of the operation of the logical product circuit 27c, since it belongs to the occurrence period of the defect, regardless of the original pre-pit.

So, the second embodiment employs the configuration that each of the counters 27d and 27e counts the number of error signals occurring in the decoding operation per above-mentioned predetermined unit amount in each of the decoders 27a and 27b, and then the comparator 27f compares such counted values with each other, and thereby the selective output is performed under the prospect that the demodulation output indicating the smaller number of errors may carry out the reliable demodulation.

As mentioned above, according to the pre-pit detecting unit Pp in the second embodiment, the execution of the compensating process for the pre-pit detecting operation with respect to the defect can reduce the trouble of inversely promoting the occurrence of the erroneous detection.

According to the first embodiment, if the defect detecting unit detects the defect, the synchronization wobbling signal S$_{SW}$ is sent to the pre-pit signal detecting unit, instead of the composite signal S$_{CX}$. Thus, the pre-pit signal detecting unit does not detect as the pre-pit the noise signal resulting from the defect and the like. Hence, this manner is desirable since it is possible to achieve the effect of reducing the erroneous detection of the pre-pit signal.

According to the second embodiment, the signal generated by decoding the pre-pit signal outputted through the removing unit (i.e., the logical product circuit 27c) is selectively outputted as the demodulation pre-pit signal S$_{PD}$, if the noise resulting from the defect is considered to be erroneously detected as the pre-pit signal. On the other hand, the signal generated by demodulating the pre-pit signal outputted by the pre-pit signal detecting unit is selectively outputted as the demodulation pre-pit signal SPD, if it is considered to be removed by the removing unit since it is superimposed with the occurrence position of the defect although it is the pre-pit. Hence, this manner is desirable since the erroneous detection or non-detection resulting from the defect can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-100398 filed on Mar. 26, 1998 including the specification, claims, drawings and summary is incorporated herein by reference in its entirety.

What is claimed is:

1. A pre-pit detecting apparatus for detecting a pre-pit signal based on a pre-pit from an optical disc, on which an information record track wobbled in accordance with a wobbling signal is formed and on which pre-pits are formed at an predetermined interval on a guide track adjacent to the information record track, said apparatus comprising:

a composite signal extracting device for extracting a composite signal, in which the pre-pit signal is superimposed on the wobbling signal, out of a reflection light from said optical disc;

a relaying device for relaying the composite signal extracted by said composite signal extracting device;

a pre-pit signal detecting device for detecting a component of the pre-pit signal from the composite signal relayed by said relaying device;

a wobbling signal extracting device for extracting a component of the wobbling signal out of the composite signal relayed by said relaying device;

a synchronization wobbling signal generating device for generating a synchronization wobbling signal, whose frequency and phase are respectively synchronous with a frequency and a phase of the wobbling signal extracted by said wobbling signal extracting device; and a defect detecting device for detecting a defect on said optical disc, said relaying device relaying the synchronization wobbling signal instead of the composite signal, if the defect is detected by said defect detecting device.

2. A pre-pit detecting apparatus for detecting a pre-pit signal based on a pre-pit from an optical disc, on which an information record track wobbled in accordance with a wobbling signal is formed and on which pre-pits are formed at an predetermined interval on a guide track adjacent to the information record track, said apparatus comprising:

a composite signal extracting device for extracting a composite signal, in which the pre-pit signal is superimposed on the wobbling signal, out of a reflection light from said optical disc;

a pre-pit signal detecting device for detecting the pre-pit signal from the composite signal extracted by said composite signal extracting device;

a defect detecting device for detecting a defect on said optical disc;

a removing device for removing the pre-pit signal detected by said pre-pit detecting device when the defect is detected by said defect detecting device and outputting the pre-pit signal when the defect is not detected by said defect detecting device; and a pre-pit signal selecting device for comparing probabilities of the pre-pit signal outputted from said removing device and the pre-pit signal outputted from said pre-pit signal detecting device and selecting one of the pre-pit signals whose probability is higher than the other on the basis of a comparison result.

3. An apparatus according to claim 1, wherein said defect detecting device detects the defect on the basis of a detection signal which is detected out of the reflection light from said optical disc.

4. An apparatus according to claim 2, wherein said defect detecting device detects the defect on the basis of a detection signal which is detected out of the reflection light from said optical disc.

5. An apparatus according to claim 3, wherein said defect detecting device comprises: a first peak holding circuit for holding a peak of the detection signal; a second peak holding circuit having a time constant longer than that of the first peak holding circuit for holding the peak of the detection signal; a level adjusting unit for adjusting an amplitude level of an output signal from the second peak holding circuit; and a comparator for comparing a level of an output signal from the first peak holding circuit with a level of an output signal from the level adjusting unit, to output a defect pulse signal, which has a high or low level corresponding to a period for which the defect occurs on the basis of a comparison result of the comparator.

6. An apparatus according to claim 4, wherein said defect detecting device comprises: a first peak holding circuit for holding a peak of the detection signal; a second peak holding circuit having a time constant longer than that of the first peak holding circuit for holding the peak of the detection signal; a level adjusting unit for adjusting an amplitude level of an output signal from the second peak holding circuit; and a comparator for comparing a level of an output signal from the first peak holding circuit with a level of an output signal from the level adjusting unit, to output a defect pulse signal, which has a high or low level corresponding to a period for which the defect occurs on the basis of a comparison result of the comparator.

7. An apparatus according to claim 1, wherein said relaying device comprises a switching device for switching to output the composite signal if the defect is not detected by said defect detecting device and switching to output the synchronization wobbling signal if the defect is detected by said defect detecting device.

8. An apparatus according to claim 2, wherein said pre-pit signal selecting device comprises: a first decoder for decoding the pre-pit detection signal outputted from said pre-pit signal detecting device; a first counter for counting the number of detection errors in the first decoder; a second decoder for decoding the pre-pit signal outputted from said removing device; a second counter for counting the number of detection errors in the second decoder; a comparator for comparing the numbers of detection errors respectively outputted by the first and second counters; and a multiplexer for selectively outputting either one of the outputs of the first and second decoders on the basis of a comparison result of the comparator.

\* \* \* \* \*